Patented Nov. 27, 1928.

1,692,817

UNITED STATES PATENT OFFICE.

CLARENCE H. CHRISTMAN, OF CHICAGO, ILLINOIS, ASSIGNOR, BY MESNE ASSIGNMENTS, TO NATIONAL ALUMINATE CORPORATION, OF CHICAGO, ILLINOIS, A CORPORATION OF DELAWARE.

PROCESS OF TREATING CORN-SYRUP AND CORN-SUGAR LIQUORS.

No Drawing. Application filed February 21, 1927. Serial No 170,060.

The present invention relates to an improved process for treating solutions containing dextrose and other soluble starch conversion products and has for one of its objects the production of such starch-conversion products that are very low in protein content, lighter in color and considerably more stable in color on storage.

The process is applicable to the manufacture of all kinds of starch-conversion products, and especially to the production of dextrose solutions such as corn syrup, corn sugar, or partially converted corn starch products as commercial glucose, amylodextrin, erythrodextrin and the like.

The older processes for the production of such starch-conversion products depended upon the hydrolysis of starch by means of dilute acids, followed by the neutralization of the conversion-product by means of suitable alkalies and filtration of the resultant solution for the separation of the precipitated impurities.

For example, in making glucose, corn starch would be heated, under pressure or otherwise, with a dilute solution of hydrochloric acid. The resultant solution was thereupon neutralized with sodium carbonate, usually in the form of soda-ash, and the proteid and other organic colloidal, as well as inorganic materials precipitated by reason of the neutralization, filtered off or removed by other suitable processes, such as centrifugalization.

The difficulty encountered in these older processes consisted chiefly in the incomplete removal of the nitrogenous constituents and fatty constituents of the starch and the incomplete precipitation of colloidally dispersed mineral substances. As a result of this incomplete separation, the starch-conversion products would not be as light in color as is desired of commercial products and they would also darken on storage.

My present invention, on the other hand, avoids the above-mentioned difficulties and produces clearer, brighter and more stable starch-conversion products.

I accomplish these results by the employment of a solution of sodium aluminate for the partial neutralization of the freshly converted starchy materials directly after their hydrolyzation with acids. While it is the usual practice to neutralize after hydrolyzation the acid employed for hydrolysis by means of soda-ash (sodium carbonate), I effect this neutralization by the use of sodium aluminate together with sodium carbonate.

The beneficial results of my new treatment are believed to result from the fact that a nucleus of aluminum hydroxide is thus formed within the solutions to be clarified, and this nucleus, by adsorption, as well as by entanglement, insures a more complete precipitation of the proteid and fatty matter contained in the starch which has been partially or completely hydrolyzed, as well as insures the precipitation of any iron, aluminum, copper, zinc, calcium or manganese salts which might be present. Inasmuch as the conversion of the starch usually takes place in brass or copper vessels, and the piping and other apparatus used in conjunction therewith are usually constructed of iron, copper, manganese and zinc salts are usually present in freshly hydrolyzed starch-product solutions.

I have found that by carrying the neutralization of the converted starch liquors substantially to what is known as the "isoelectric point," the point of minimum solubility of the impurities to be removed is reached. This point varies somewhat according to the nature of the starch employed, but is generally within the range corresponding to a hydrogen-ion concentration of from pH 3.8 to pH 4.5, and usually at substantially pH 4.2.

As a specific example of one method of carrying out my invention, I will describe the preparation of glucose or corn syrup.

A starch-converter of the usual type of construction is charged with 1800 gallons of a suspension of cornstarch containing about 50% of starch by weight. 55 lbs. of 18° Bé. hydrochloric acid are added and the hydrolysis of the starch effected at 40 pounds steam pressure, the operation being continued until test-samples withdrawn from the converter will show the desired degree of conversion (from 40-45% of the starch on a dry basis) as evidenced by the color assumed by the test sample on the addition of a solution containing iodine. The color assumed by a sample when thus tested with iodine is a reddish brown, as distinguished from the pure blue of unconverted starch. The conversion or hydrolysis under the given condition requires about six minutes from the time the pressure reaches the predetermined point (40 lbs.). Lower pressures require a somewhat longer period.

The hydrolyzed starch is then discharged from the converter immediately into the neutralizing vats or tanks. Simultaneous with the introduction of the hydrolized starch liquor a sufficient amount of a preliminarily prepared solution of a reagent containing soda ash and sodium aluminate is added until the free acid in the starch liquor has been neutralized to a range corresponding to a hydrogen-ion concentration equivalent to a value of pH 3.8 to pH 4.5. This range can readily be determined by the use of an indicator such as brom-cresol green which changes from yellow to a deep blue at this hydrogen-ion concentration.

This range of acidity (pH 3.8–pH 4.5) covers the iso-electric points for the suspended and colloidally dispersed organic and inorganic impurities, which, in other words, means the point at which they are least soluble and hence most completely precipitated.

It was found that this treatment successfully removes proteid and fatty impurities as well as aluminum, copper, zinc, iron and manganese salts.

The reagent above mentioned consists, for a charge of the size under discussion, of 18 lbs. of soda ash ($Na_2CO_3$) and 2 lbs. of a sodium aluminate solution having a composition of 33% $Na_2Al_2O_4$, 9% $NaOH$, 58% $H_2O$. Obviously ordinary solid sodium aluminate can be employed in place of this solution by dissolving the dry sodium aluminate in water and adding the required amount of sodium hydroxide. In order to enable the reagent to be introduced into the converted starch liquor without causing unduly high local concentrations of alkali resulting from incomplete mixing, the materials (soda ash and sodium aluminate) are dissolved in a considerable quantity of water. A solution having such a strength that 1 milliliter of the same will require 45 ml. of $n/10$ acid, using methyl orange indicator for neutralization is found to be suitable. It is good practice to keep a tank of the stock reagent on hand for neutralizing the successive batches of hydrolyzed starch as they come from the converter. Such a stock solution may be made up, for example, by dissolving 1089 kilograms (2400 lbs.) of soda ash and 152 kilograms (335 lbs.) of the sodium aluminate solution in water and making the total volume of liquid up to 4841 liters (1279 gallons).

The solution thus neutralized substantially to the iso-electric point of the suspended colloids, as above mentioned, is then allowed to stand for a short time, which will permit the precipitated materials to agglomerate. By reason of the specific gravity of the solution, they will rise to the surface. The solution is thereupon filtered, either through a plate-and-frame press, an Oliver filter, or clarified by means of a centrifugal machine. The addition of a small amount of finely divided infusorial earth, such as kieselguhr or "Filtercel" may be advisable in order to build up a good filter-cake in the filter press.

The clear filtrate obtained by the preceding method is then worked up into glucose or other corn starch conversion product as may be desired, this last processing forming no part of my present invention.

It has been found, however, that corn syrup and corn sugar when clarified by the process herein described as my invention has a greater degree of clarity and also a lower sucrose-inverting power than when made by ordinary methods.

It is to be understood that other water soluble aluminates may be employed or substituted for the sodium aluminate with effective results, although sodium aluminate is preferred, because it is cheaper and more easily obtained.

While I have described my invention in connection with the manufacture of glucose, (or corn syrup) it will be obvious that the same is applicable to the production of any soluble type of starch conversion product, or even of such products as are only soluble while hot, as the operation can then be carried out near the boiling point of the particular solution.

Furthermore, I do not wish to be limited to the exact amounts of materials herein specific nor to the exact details as to procedure, but claim as my invention:

1. The process of purifying and clarifying solutions of hydrolyzed carbohydrates which comprises neutralizing such solutions with a reagent comprising sodium aluminate.

2. The process of purifying and clarifying solutions of hydrolyzed starchy materials which comprises neutralizing such solutions with a reagent comprising sodium aluminate.

3. The process of neutralizing solutions containing hydrolyzed carbohydrate material which comprises the addition of sodium carbonate and sodium aluminate to such solutions.

4. The process of neutralizing solutions containing hydrolyzed starch which comprises adding sodium carbonate and sodium aluminate to such solutions.

5. In the manufacture of glucose (corn syrup) and corn sugar, the step of neutralizing the hydrolytically converted starch liquor with a reagent comprising sodium aluminate.

6. In the manufacture of corn syrup and corn sugar, the step of neutralizing the liquor containing the hydrolytically converted starch with a reagent comprising sodium carbonate and sodium aluminate.

7. The process of manufacturing corn syrup and corn sugar from starch which comprises hydrolyzing the starch with hydrochloric acid, neutralizing the resultant liquor with sodium carbonate and sodium aluminate to a hydrogen-ion concentration equivalent to pH 3.8–pH 4.5, adding infusorial earth to the solution thus neutralized, filtering the said solution to remove precipitated and suspended insolubles therefrom, and working up the resultant clear filtrate into corn syrup and corn sugar by ways now known.

8. A composition of materials comprising sodium carbonate and sodium aluminate for the clarification of solutions containing hydrolyzed carbohydrate materials.

9. A composition of materials comprising 18 parts of soda ash and 2 parts of a solution comprising sodium aluminate solution for neutralizing solutions containing hydrolyzed starch materials.

10. A composition of materials comprising 18 parts of soda-ash and 2 parts of sodium aluminate solution containing 33% of $Na_2Al_2O_4$ as a reagent for neutralizing hydrolyzed corn starch solutions.

11. Corn syrup clarified by means of a solution comprising sodium aluminate and characterized by being substantially free from proteid and fatty matter.

12. Corn sugar that has been clarified while in solution with a reagent comprising sodium aluminate and characterized by being substantially free from proteid and fatty matter.

13. The process of manufacturing corn syrup and corn sugar which comprises hydrolyzing a carbohydrate with acid to produce a sugar, in solution, neutralizing the resultant solution with a reagent comprising sodium aluminate to a range corresponding to an hydrogen-ion concentration of pH 3.8–pH 4.5, thereby causing substantially complete precipitation of proteid, fatty and metallic impurities from said solution.

14. The process of treating hydrolytic conversion-products of carbohydrates which comprises the addition of soluble aluminate to an acid-reacting solution containing the said conversion products.

15. The process of treating hydrolytic conversion products of starchy materials which comprises the addition of soluble aluminate to acid-reacting solutions of the said conversion products.

16. The process of purifying and clarifying solutions of hydrolyzed carbohydrates which comprises neutralizing such solutions with a reagent comprising a soluble aluminate.

17. The process of purifying and clarifying solutions of hydrolyzed starchy materials which comprises neutralizing such solutions with a reagent comprising a soluble aluminate.

18. In the manufacture of glucose (corn syrup) and corn sugar, the step of neutralizing the hydrolytically converted starch liquor with a reagent comprising a soluble aluminate.

19. In the manufacture of corn syrup and corn sugar, the step of neutralizing the liquor containing the hydrolytically converted starch with a reagent comprising soluble aluminate and sodium carbonate.

20. In the manufacture of glucose (corn syrup) and corn sugar, the step of neutralizing the hydrolytically converted starch liquor with a reagent comprising a soluble aluminate and an alkali.

In witness whereof, I have hereunto subscribed my name.

CLARENCE H. CHRISTMAN.